United States Patent Office 3,471,519
Patented Oct. 7, 1969

3,471,519
SUBSTITUTED PHTHALANS AND
INTERMEDIATES
Murle W. Klohs, Tarzana, and Francis J. Petracek,
Agoura, Calif., assignors to Dart Industries Inc., Los
Angeles, Calif., a corporation of Delaware
No Drawing. Continuation-in-part of application Ser. No.
607,400, Jan. 5, 1967. This application Jan. 29, 1968,
Ser. No. 701,132
Int. Cl. C07d 5/38, 5/34; A61k 27/00
U.S. Cl. 260—346.2                          6 Claims

ABSTRACT OF THE DISCLOSURE 1-($\alpha$-amino-lower alkyl)-3-phenylphthalan final products 1-($\alpha$-nitro-lower alkyl)-3-phenylphthalan intermediates obtained in their synthesis, and cis- and trans-isomers of both. The 1-($\alpha$-amino-lower alkyl)-3-phenylphthalan final products possess pharmacological activity in reducing secretion of gastric acid.

---

This application is a continuation-in-part of our now abandoned application Ser. No. 607,400 filed Jan. 5, 1967 and entitled "Substituted Phthalans and Intermediates."

This invention relates to compositions of matter classified in the art of chemistry as substituted phthalans and to intermediates obtained in the synthesis thereof.

The invention sought to be patented, in its final product composition aspect, is described as residing in the concept of a chemical compound having a molecular structure wherein there is attached to the phthalan nucleus at the 1-position an $\alpha$-amino-lower alkyl substituent through its $\alpha$-carbon atom and at the 3-position a phenyl radical.

The invention sought to be patented, in its intermediate composition aspect, is described as residing in the concept of a chemical compound having a molecular structure wherein there is attached to the phthalan nucleus at the 1-position an $\alpha$-nitro-lower alkyl substituent through its $\alpha$-carbon atom and at the 3-position a phenyl radical.

As used throughout the application the term "lower alkyl" embraces both straight and branched chain alkyl radicals containing from 1 to 6 carbon atoms, for example, but without limitation, methyl, ethyl, n-propyl, isopropyl, n-butyl, n-amyl, sec-amyl, n-hexyl, 2-ethylbutyl, 2,3-dimethylbutyl and the like, and the term "halo" embraces bromo, chloro, fluoro and iodo.

Infra-red and ultra-violet spectral analysis, Nuclear Magnetic Resonance data, and elemental analysis of the tangible embodiments of this invention in both its final product and intermediate composition aspects, taken together with the nature of the starting materials and mode of synthesis, positively confirm the structures of the compounds sought to be patented.

The tangible embodiments of this invention possess the inherent applied use characteristics of possessing significant pharmacological activity, without adverse toxicity, in inhibiting secretion of gastric acid. The compounds of the present invention have been found to compare favorably with atropine, a known inhibitor of gastric secretion, in rats by the method described by Komarov et al. [Gastroenterology 3:406 (1944)].

The manner and process of making and using the invention will now be generally described so as to enable one skilled in the art of chemistry to make and use the same as follows:

The following reaction sequence is illustrative of the preparation of the tangible embodiments of this invention in its intermediate and final product composition aspects:

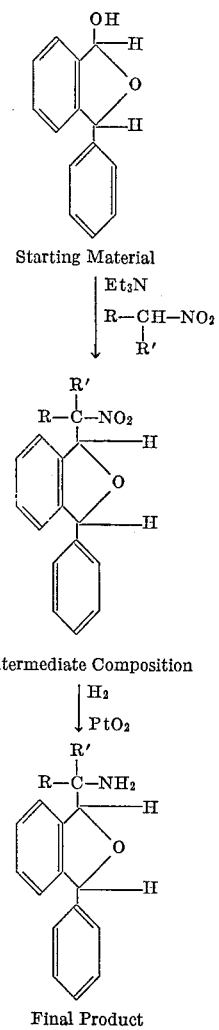

Starting Material

Intermediate Composition

Final Product wherein RR'C form, together, a lower alkyl radical.

The starting materials for the preparation of the tangible embodiments of this invention are 1-phenyl-3-hydroxyphthalans that are convveniently prepared from phthalaldehyde by treatment with an appropriate phenyl magnesium halide, such as phenyl magnesium bromide, in the presence of an inert solvent, such as ether, at a temperature of from 0° C. to room temperature.

In carrying out the above-described reaction sequence, starting materials may be employed wherein the 1-phenyl radical and/or the phenyl portion of the phthalan nucleus bears one or more lower alkyl, lower alkoxy, halo or trifluoromethyl substituents. Such starting materials are prepared by treatment of phthalaldehyde, or a substituted phthalaldehyde with a phenyl magnesium halide or substituted phenyl magnesium halide, such starting materials being the full equivalent of the specific 1-phenyl-3-hydroxy phthalan starting material depicted in the above-described reaction sequence. Their use yields intermediates and final products bearing corresponding substitution. Such intermediates and final products have the same utility as the specific intermediate and final product depicted hereinabove and are included within the scope of this invention.

In addition, the amino radical of the 1-position substituent in the final product may be readily converted to mono- or di-lower alkylamino radicals by methods readily known to those skilled in the art of chemistry for converting primary amines to mono- and di-lower alkyl derivatives thereof. Certain of these methods will be described in detail hereinafter.

The substituted phthalans of this invention, in both its intermediate and final product composition aspects are capable of existing both as trans- and cis-isomers. In the above-depicted reaction sequence, separation of the two isomeric forms is readily achieved through fractional crystallization of the intermediate, completeness of the separation being conveniently monitored by means of nuclear magnetc resonance analysis. Use of the separated trans- or cis-intermediate in the next step of the reaction sequence then yields the final product in corresponding isomeric form. Both isomeric forms are included within the scope of the tangible embodiments of this invention.

According to the reaction sequence depicted above, the starting material is converted to the tangible embodiments of this invention, in its intermediate composition aspect, by treatment with an appropriate nitro-lower alkane, for example nitromethane, nitroethane and the like, in the presence of a trimethylamine or triethylamine basic catalyst in an inert solvent, such as isopropanol, at the reflux temperature of the solvent used. The 1-($\alpha$-nitro-lower alkyl)-3-phenylephathalan intermediate thus obtained is isolated and recovered by conventional techniques.

The intermediate thus obtained may be converted to the tangible embodiments of the invention in its final product composition aspect without further treatment to yield such final products as mixtures of both cis- and trans-isomers or, if desired, may be fractionally crystallized to separate the cis- and trans-isomers. In either case conversion to the corresponding form of the final product is accomplished according to essentially the same synthetic sequence except that in the case of the pure isomers the reaction must be kept acidic to prevent re-isomerization and yield of the product again as a mixture of both cis- and trans-isomeric forms. In this conversion the nitro radical of the intermediate is reduced to an amino radical by catalytic hydrogenation in the presence of an inert solvent, over an appropriate catalyst, such as, for example, Raney nickel, palladium over carbon, platinic oxide and the like at a temperature of up about 80° C., thus yielding the tangible embodiments of this invention in its final product composition aspect.

The 1-($\alpha$-amino-lower alkyl)-3-phenylphthalans comprising the tangible embodiments of the invention in its final product composition aspect wherein the amino radical is unsubstituted are converted to equivalent 1-[$\alpha$-(N,N-di-lower alkylamino) lower alkyl]-3-phenylphthalans by means of reductive alkylation through treatment with an appropriate aldehyde or ketone in the presence of an inert solvent and with the aid of a catalyst such as palladium over carbon. Where straight chain lower alkyl substitution on the amino nitrogen atom is desired, a straight chain aldehyde is employed, for example methyl substituents result from the use of formaldehyde, ethyl from acetaldehyde, propyl from propionaldehyde, n-butyl from butyraldehyde; where branched chain lower alkyl substitution is desired, with attachment to the nitrogen atom through a carbon atom removed from the point of branching by one or more carbon atoms, a branched chain aldehyde is employed, for example iso-butyl (—$CH_2CH(CH_3)_2$) substituents result from the use of isobutyraldehyde, iso-amyl (—$CH_2CH_2CH(CH_3)_2$) from iso-valeraldehyde; and where branched chain lower alkyl substitution is desired, with attachment to the nitrogen atom through the carbon atom forming the point of branching, a ketone is employed, for example iso-propyl substituents result from the use of acetone, sec-butyl

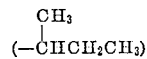

from ethylmethyl ketone, sec-amyl (—$CH(CH_2CH_3)_2$) from diethyl ketone.

Where the desired compound is a 1-($\alpha$-dimethylamino-lower alkyl)-3-phenylphthalan the preferred method of converting the unsubstituted amino radical is through use of the well-known Leuckart reaction.

In accordance with one procedure, 1-[$\alpha$-(N-lower alkylamino) lower alkyl] 3-phenylphthalans are formed by conversion of the free amine first to the 1-($\alpha$-lower alkylamido-lower alkyl)-3-phenylphthalan by treatment with an appropriate acid-anhydride reagent. The chain length of the mono-lower alkyl substituent in the final product is dependent upon the nature of the anhydride reagent used in forming the amide. Thus acetic-formic anhydride reagent [J. Org. Chem. 23:728(1958)] is used to prepare the mono-methyl substituent, acetic anhydride the mono-ethyl, propionic acid anhydride the mono-n-propyl, etc. The amide thus formed is then reduced with a hydride reducing agent such as lithium aluminum hydride to yield the 1-[$\alpha$-(N-lower alkylamino) lower alkyl]-3-phenylphthalans that comprise embodiments of the invention in its final product composition aspect where the amine function at the 2-position is mono-substituted with a lower alkyl radical. In accordance with an alternate procedure, the 1-($\alpha$-amino-lower alkyl)-3-phenylphthalan is treated with a lower alkyl, for example ethyl, ester of a chloro-carboxylic acid followed by reduction of the resulting intermediate with lithium aluminum hydride. Where an N-methylamino radical is desired, a chloroformate ester is used.

The products of the reactions are recovered by conventional techniques of isolation and purification.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids, and polybasic acids, such as the citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexylbromide and the like. Such pharmaceutically useful acid-addition and quaternary ammonium salts are the full equivalents of the bases from which they are derived and are included within the scope of this invention.

The tangible embodiments of this invention, in its final product composition aspect, either as free bases or in the form of a non-toxic pharmaceutically acceptable acid-addition or quaternary ammonium salt, can be combined with conventional pharmaceutical diluents and carriers to provide such dosage forms as tablets, suspensions, solutions, suppositories and the like.

The individual unit dosage and frequency of administration is determined not only by the nature and severity of the condition for which the subject seeks relief, but in addition upon age, weight, and species of subject, its underlying physical condition and the route of administration. It will, accordingly, be within the judgment and skill of the practitioner administering the drug to determine the exact amount to be administered so as to be non-toxic, yet pharmaceutically effective in reducing gastric secretion.

The best mode contemplated by the inventors for carrying out the invention will now be set forth as follows:

The following examples illustrate the preparation of the tangible embodiments of this invention in its final product composition aspect wherein the product is obtained as a mixture of the cis- and trans-isomeric forms:

EXAMPLE 1

(a) 1-nitromethyl-3-phenylphthalan: A solution of 1-hydroxy-3-phenylphthalan (20 g., 0.094 mole) in isopropanol (150 ml.), nitromethane (150 ml.) and triethylamine (20 ml.) are refluxed for 37 hours. The product is obtained by chromatographic purification in a yield of 60% and recrystallized from methanol/water in the form of needles, M.P. 101.5° C.–103.5° C.

Analysis.—Calculated for $C_{15}H_{13}NO_3$: C, 70.58; H, 5.13; N, 5.49. Found: C, 70.43; H, 5.10; N, 5.58.

(b) 1-aminomethyl-3-phenylphthalan maleate: The nitrophthalan, from Example 1a, (14.2 g., 0.05 mole) in methanol (250 ml.) is hydrogenated at room temperature and atmospheric pressure in the presence of platinic oxide catalyst (1.0 g.). Hydrogenation is complete in less than an hour. Evaporation gives 11.6 g. of a light amber colored oil. The product is recovered in the form of its maleate salt (15.3 g., 81% yield), M.P. 157°–159° C.

Analysis.—Calculated for $C_{19}H_{19}O_5N$: C, 66.85; H, 5.61; O, 23.44; N, 4.10. Found: C, 66.38; H, 5.48; O, 23.84; N, 4.09.

EXAMPLE 2

(a) 1-nitromethyl-3-(o-tolyl)phthalan: Yield 59 g. (50%) needles, M.P. 99°–100° C. (from 1-hydroxy-3-(o-tolyl)phthalan by the procedure of Example 1a).

Analysis.—Calculated for $C_{16}H_{15}O_3N$: C, 71.36; H, 5.61; O, 17.82; N, 5.20. Found: C, 71.36; H, 5.59; O, 17.58; N, 4.90.

(b) 1-aminomethyl-3-(o-tolyl)phthalan hydrochloride: Yield 42% irregular prisms, M.P. 230°–233° C. (from product of step "a" by the procedure of Example 1b).

Analysis.—Calculated for $C_{16}H_{18}ONCl$: C, 69.68; H, 6.57; O, 5.80; Cl, 12.85. Found: C, 69.41; H, 6.54; O, 6.18; Cl, 12.96.

EXAMPLE 3

(a) 1-nitromethyl-3-(p-chlorophenyl)phthalan: Yield 61 g. (50%) crystals, M.P. 121°–126° C. (from 1-hydroxy-3-(p-chlorophenyl)phthalan by the procedure of Example 1a).

Analysis.—Calculated for $C_{15}H_{12}O_3NCl$: C, 62.20; H, 4.14; N, 4.83; Cl, 12.24. Found: C, 62.05; H, 4.16; N, 4.83; Cl, 12.64.

(b) 1-aminomethyl-3-(p-chlorophenyl)phthalan hydrochloride: Yield 18.2 g. (57%) crystals, M.P. 210° C. (sint. at 160° C.), (from the product of step "a" by the procedure of Example 1b).

Analysis.—Calculated for $C_{15}H_{14}ONCl \cdot HCl \cdot CH_3OH$: C, 58.53; H, 5.83; O, 9.74; N, 4.26; Cl, 21.60. Found: C, 58.79; H, 5.32; O, 9.66; N, 4.33; Cl. 22.08.

The following example illustrates the preparation of tangible embodiments of this invention as mixtures of the cis- and trans-isomeric forms wherein one or both of the hydrogen atoms of the amine moiety have been replaced by a lower alkyl substituent.

EXAMPLE 4

(a) 1-methylaminomethyl-3-phenylphthalan picrate: The primary amine from Example 1b, in the form of its fumarate salt (10.0 g., 0.030 mole), is converted to the N-carboxyethyl derivative by treatment at room temperature with ethylchloroformate (4.9 g., 0.045 mole) in chloroform (20 ml.) in the presence of aqueous sodium hydroxide (4.0 g.) solution. The N-carboethoxy derivative (8 g., 0.027 mole) in tetrahydrofuran/ether is then subjected to reduction with lithium aluminum hydride (2.0 g., 0.054 mole) to give 6.5 g. of the free base. The product is characterized in the form of its picrate salt, M.P. 196°–197° C.

Analysis.—Calculated for $C_{22}H_{20}O_8N_4$: C, 56.41; H, 4.30; O, 27.33; N, 11.96. Found: C, 56.28; H, 4.28; O, 27.28; N, 11.93.

By the same procedure are also prepared:

(b) 1-methylaminomethyl-3-(o-tolyl)phthalan hydrochloride: Yield: 6.2 g. colorless leaflets (87%), M.P. 219°–222° C.

Analysis.—Calculated for $C_{17}H_{20}ONCl$: C, 70.45; H, 6.95; O, 5.52; N, 4.83; Cl, 12.33. Found: C, 70.31; H, 6.89; O, 5.87; N, 5.07; Cl, 12.07.

EXAMPLE 5

(a) 1-dimethylaminomethyl-3-phenylphthalan: The primary amine (8.0 g., 0.03 mole), from Example 2a, in the form of its free base, is treated according to the well-known Leuckart reaction by refluxing overnight with formaldehyde (7.4 g., 37% soln., 0.074 mole) and formic acid (8.4 g., 88% soln., 0.155 mole). Workup gives a yield (88%) of an oily free base that is converted to the fumarate salt, M.P. 147°–150° C. (sint. at 110° C), for analysis.

Analysis.—Calculated for $C_{27}H_{23}O_5N$: C, 68.28; H, 6.28; O, 21.66; N, 3.79. Found: C, 67.89; H, 6.28; O, 21.90; N, 3.81.

By the same procedure are also prepared:

(b) 1-dimethylaminomethyl-3-(o-tolyl)phthalan hydrochloride: Yield: 4.0 g. (52%), M.P. 211°–215° C.

Analysis.—Calculated for $C_{18}H_{22}ONCl$: C, 71.15; H, 7.30; O, 5.26; N, 4.61; Cl, 11.67. Found: C, 70.83; H, 7,21; O, 5.44; N, 4.94; Cl, 11.54.

The following examples are illustrative of the preparation of the tangible embodiments of this invention in pure cis- or trans-isomeric form.

EXAMPLE 6

A mixture (113 g.) of cis- and trans-1-nitromethyl-3-phenylphthalan, prepared as described in Example 1a, was fractionally crystallized from benzene and isopropanol to yield:

(a) trans - 1 - nitromethyl - 3 - phenylphthalan (42 g., 37% yield) in the form of prisms, M.P. 91°–94° C.

(b) cis - 1 - nitromethyl - 3 - phenylphthalan (35 g., 31% yield) in the form of needles, M.P. 83°–86° C.

By the same procedure were also prepared by fractional crystallization of mixtures of the appropriately substituted 1-nitromethyl-3-phenylphthalan intermediates:

(c) trans - 1 - nitromethyl - 3 - (p - chlorophenyl) phthalan, M.P. 128°–131° C.

(d) cis - 1 - nitromethyl - 3 - (p-chlorophenyl)phthalan, M.P. 87°–92° C.

EXAMPLE 7

(a) trans-1-aminomethyl-3-phenylphthalan: The trans-nitro compound from Example 6a (40.4 g., 0.158 mole) in tetrahydrofuran (150 ml.) and methanol (400 ml.) was hydrogenated in the presence of platinic oxide catalyst (3.0 g.). The hydrogenation was complete in two hours. The product was obtained in the form of its acetate salt (41.1 g., 91.5% yield), M.P. 76°–79° C.

Analysis.—Calculated for $C_{15}H_{15}ON \cdot C_2H_4O_2 \cdot \frac{1}{2}H_2O$: C, 69.37; H, 6.85; N, 4.76. Found: C, 69.74; H, 6.77; N, 4.95.

(b) cis-1-aminomethyl-3-phenylphthalan: The cis-nitro compound from Example 6b (30 g., 0.118 mole) in warm methanol (500 ml.) was hydrogenated in the presence of platinic oxide (1.5 g.). The hydrogenation was complete in one hour. The product was obtained in the form of its acetate salt (19.5 g., 65% yield), M.P. 108°–110° C.

Analysis. — Calculated for $C_{15}H_{15}ON \cdot C_2H_4O_2$: C, 71.56; H, 6.71; N, 4.91. Found: C, 71.79; H, 6.85; N, 5.14.

(c) trans - 1 - aminomethyl - 3 - (p - chlorophenyl) phthalan: The trans-nitro compound from Example 6c (25 g.) was dissolved in a warm mixture (400 ml.) of tetrahydrofuran/methanol (1 to 3) containing acetic acid (5.4 ml.) and hydrogenated at 40° C. in the presence of platinic oxide (2.5 g.). Hydrogenation was complete in three hours. The product was obtained in the form of its acetate salt (25 g., 90% yield), M.P. 108°–113° C. For purposes of elemental analysis the oxalate salt, M.P. 153°–154° C., was prepared.

Analysis.—Calculated for $C_{15}H_{14}ONCl \cdot C_2H_4O_2$: C, 58.30; H, 4.61; N, 4.00; Cl, 10.12. Found: C, 58.17; H, 4.74; N, 4.19; Cl, 10.13.

(d) cis - 1 - aminomethyl - 3 - (p - chlorophenyl)phthalan: The cis-nitro compound from Example 6d (45.3 g., 0.156 mole) was dissolved in warm methanol (1000 ml.) containing acetic acid (18 ml.) and hydrogenated in the presence of platinic oxide (2.3 g.). Hydrogenation was complete in 90 minutes. The product was obtained in the form of its acetate salt (54.0 g., 91% yield), M.P. 139°–143° C.

The following examples illustrate the preparation of the tangible embodiments of this invention in pure isomeric wherein one or both of the hydrogen atoms of the amine moiety have been replaced by a lower alkyl substituent.

EXAMPLE 8

(a) trans - 1 - (N - methylaminomethyl)-3-phenylphthalan: The trans-primary amine from Example 7a (25.0 g., 0.088 mole) was treated under Schotten-Bauman conditions with ethyl chloroformate to yield 23.5 g. (90%) of crystalline trans-N-carbethoxy-1-aminomethyl-3-phenylphthalan intermediate. This intermediate (4.44 g., 0.015 mole) in dry tetrahydrofuran (60 ml.) and 1 molar diborane (60 ml., 4 molar ratio) were refluxed for four hours. The product was obtained in 50% yield as the hydrochloride salt. Recrystallization from ethanol gave needles, M.P. 225°–232° C.

Analysis.—Calculated for $C_{16}H_{17}NO \cdot HCl$: C, 69.67; H, 6.59; N, 5.08; Cl, 12.85. Found: C, 69.61; H, 6.75; N, 5.27; Cl, 12.95.

(b) cis - 1 - (N - methylaminomethyl)-3-phenylphthalan: The cis-primary amine from Example 2c (20.8 g., 0.073 mole) was treated under Schotten-Bauman conditions with ethyl chloroformate to give after 90 minutes 21.7 g. (100%) of cis - N-carbethoxy-1-aminomethyl-3-phenylphthalan intermediate. This intermediate (21.2 g., 0.0714 mole) was reduced with a 3 molar ratio of diborane in tetrahydrofuran by refluxing for twenty-four hours. The product was obtained by crystallization from ethanol in the form of the hydrochloride salt, M.P. 231°–235° C.

Analysis.—Calculated for $C_{16}H_{17}NO \cdot HCl$: C, 69.67; H, 6.59; N, 5.08. Found: C, 69.12; H, 6.88; N, 5.48.

By the same procedure also were prepared:

(c) trans - 1 - (N - methylaminomethyl)-3-(p-chlorophenyl)phthalan hydrochloride: (16.0 g., 82% yield), M.P. 225°–227° C.

Analysis:—Calculated for $C_{16}H_{16}NO \cdot HCl$: C, 61.95; H, 5.52; N, 4.52; Cl, 22.86. Found: C, 62.50; H, 5.57; N, 4.29; Cl, 21.46.

(d) cis - 1 - (N-methylaminomethyl)-3-chlorophenyl)phthalan hydrochloride: (14 g., 75% yield), M.P. 232°–236° C.

Analysis:—Calculated for $C_{16}H_{16}NO \cdot HCl$: C, 61.95; H, 5.52; N, 4.52; Cl, 22.86. Found: C, 62.25; H, 5.27; N, 4.29; Cl, 21.72.

EXAMPLE 9

(a) trans - 1 - (N,N-dimethylaminomethyl)-3-phenylphthalan: The hydrochloride (7.2 g., 75%) M.P. 186X 189° C. (dec.), was prepared by catalytic dimethylation from the isomerically pure primary amine prepared in Example 7a.

Analysis:—Calculated for $C_{17}H_{19}NO \cdot HCl$: C, 70.45; H, 6.97; N, 4.83; Cl 12.23. Found: C, 70.06; H, 7.27; N, 4.65; Cl, 12.40.

By the same procedure also were prepared:

(b) cis - 1 - (N,N-dimethylaminomethyl)-3-phenylphthalan hydrochloride: (7 g., 81% yield), M.P. 235°–237° C.

Analysis:—Calculated for $C_{17}H_{18}ON \cdot HCl$: C, 70.45; H, 6.97; N, 4.83; Cl, 12.23. Found: C, 70.24; H, 6.86; N, 4.99; Cl, 12.23.

(c) trans - 1 - (N,N-dimethylaminomethyl)-3-(p-chlorophenyl)phthalan hydrochloride: Yield: 6.2 g. (92%), M.P. 187°–191° C.

Analysis.—Calculated for $C_{17}H_{18}ONCl \cdot HCl$: C, 62.96; H, 5.90; O, 4.93; N, 4.32; Cl, 21.86. Found: C, 62.93; H, 5.96; O, 5.01; N, 4.36; Cl, 21.77.

(d) cis - 1 - (N,N-dimethylaminomethyl)-3-(p-chlorophenyl)phthalan malonate: (20 g., 80% yield as hydrochloride then converted to malonate), M.P. 232°–234° C.

The following example illustrates the pharmacological effectiveness of tangible embodiments of this invention in its final product composition aspect as anti-secretory agents:

EXAMPLE 10

Acute toxicity determinations were made of the compounds prepared in the foregoing examples in accordance with standard pharmacological test procedures and revealed the following:

| Compound | LD$_{50}$, mg./kg. | |
|---|---|---|
| | Mouse (intraperitoneal) | Rat (oral) |
| 1-aminomethyl-3-phenylphthalan | 118 | |
| cis-1-(N-methylaminomethyl)-3-phenylphthalan | 84 | 178 |
| Trans-1-(N-methylaminomethyl)-3-phenylphthalan | 84 | 178 |
| Cis-1-(N-methylaminomethyl)-3-(p-chlorophenyl)phthalan | 94 | 510 |
| Trans-1-(N-methylaminomethyl)-3-(p-chlorophenyl)phthalan | 93 | 310 |
| Cis-1-(N,N-dimethylaminomethyl)-3-phenylphthalan | 120 | 225 |
| Trans-1-(N,N-dimethylaminomethyl)-3-phenylphthalan | 160 | 300 |
| Cis-1-(N,N-dimethylaminomethyl)-3-(p-chlorophenyl)phthalan | 85 | 265 |
| Trans-1-(N,N-dimethylaminomethyl)-3-(p-chlorophenyl)phthalan | 90 | 300 |

The anti-secretory activity of the compounds according to the present invention was determined by the procedure of S. A. Komarov et al., Gastroenterology 3:406–13 (1944). In this method the pylorus of the rat is ligated under anesthesia, and four hours later the animal is sacrificed and the contents of the stomach analyzed for amount of free hydrochloric acid secreted during the period following ligation. Drugs being tested were administered orally one hour before ligation. Controls were administered water instead of drug and atropine sulfate was used as a standard control A decrease in the volume of acid secreted is an indication of anti-secretory activity for the compound administered. The results were as follows:

NOTE:—In the following table the drug administered is designated by letter. The letters correspond to the following compounds:

Letter: Compound
A ____ cis - 1 - (N,N - dimethylaminomethyl)-3-phenylphthalan fumarate.
B ____ trans - 1 - (N,N-dimethylaminomethyl)-3-phenylphthalan hydrochloride.
C ____ cis - 1 - (N - methylaminomethyl) - 3 - phenylphthalan hydrochloride.
D ____ cis - 1 - (N,N-dimethylaminomethyl)-3-p-chlorophenyl)phthalan hydrochloride.
E ____ cis - 1 - (N-methylaminomethyl) - 3 - (p-chlorophenyl)phthalan hydrochloride.

| Drug | Dose, mg./kg. | Number of animals | Free hydrochloric acid secreted, μeq./100 g./4 hrs.[1] |
|---|---|---|---|
| Control | | 88 | 199 |
| Atropine | 1.5 | 6 | 184 |
| | 3.0 | 8 | 96 |
| A | 7.5 | 17 | 160 |
| | 15.0 | 13 | 74 |
| | 30.0 | 22 | 35 |
| B | 12.8 | 14 | 165 |
| | 25.5 | 14 | 76 |
| C | 5.5 | 16 | 185 |
| | 10.5 | 17 | 109 |
| D | 6.5 | 19 | 171 |
| | 13.3 | 18 | 81 |
| | 26.5 | 25 | 73 |
| E | 6.5 | 18 | 213 |
| | 12.8 | 15 | 154 |
| | 25.5 | 17 | 104 |

[1] Acid secretion is expressed as μeq. free acid secreted per 100 grams body weight during the four hours of the test.

These results show that both trans- and cis-isomers (A and B) are effective in inhibiting gastric secretion, and that at varying dosage levels each of the variously substituted compounds was effective in the inhibition of gastric secretion. Moreover, all compounds compare favorably with atropine.

The subject matter which the applicants regard as their invention is particularly pointed out and distinctly claimed as follows:

1. 1-(α-nitro-lower alkyl)-3-phenylphthalan.
2. 1-nitromethyl-3-phenylphthalan.
3. 1-(α-amino-lower alkyl)-3-phenylphthalan.
4. 1-aminomethyl-3-phenylphthalan.
5. 1-(N-methylaminomethyl)-3-phenylphthalan.
6. 1-(N,N-dimethylaminomethyl)-3-phenylphthalan.

References Cited

UNITED STATES PATENTS 3,284,469   11/1966   Keller _____ 260—346.2

ALEX MAZEL, Primary Examiner

B. I. DENTZ, Assistant Examiner

U.S. Cl. X.R.

424—285